March 29, 1966 G. BRINKMANN 3,242,804
SLIDE PROJECTOR WITH A MECHANICALLY DRIVEN SLIDE-CHANGING
AND MAGAZINE-STEPPING DEVICE
Filed Feb. 28, 1964 2 Sheets-Sheet 1
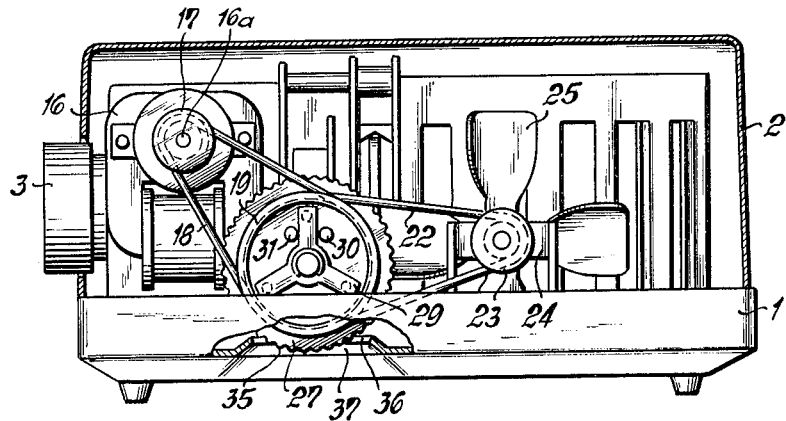
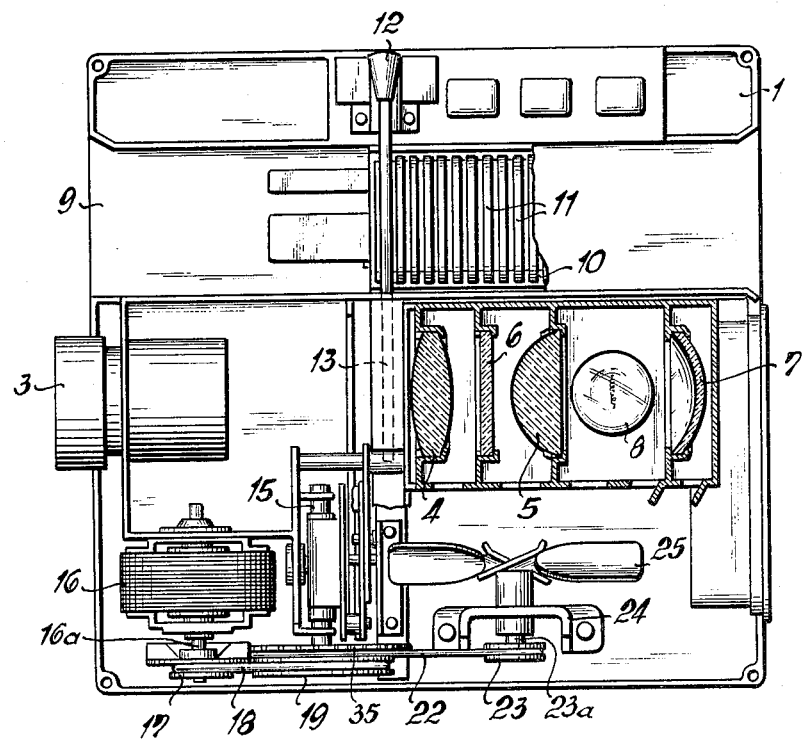

March 29, 1966 G. BRINKMANN 3,242,804
SLIDE PROJECTOR WITH A MECHANICALLY DRIVEN SLIDE-CHANGING
AND MAGAZINE-STEPPING DEVICE
Filed Feb. 28, 1964 2 Sheets-Sheet 2

United States Patent Office 3,242,804
Patented Mar. 29, 1966

3,242,804
SLIDE PROJECTOR WITH A MECHANICALLY DRIVEN SLIDE-CHANGING AND MAGAZINE-STEPPING DEVICE
Gerhardt Brinkmann, Braunschweig, Germany, assignor to Voigtlander A.G., Braunschweig, Germany, a corporation of Germany
Filed Feb. 28, 1964, Ser. No. 348,052
Claims priority, application Germany, Mar. 5, 1963, V 14,897
4 Claims. (Cl. 88—28)

This invention relates to a slide projector with a mechanically driven slide-changing and magazine-stepping device, wherein an overload clutch is incorporated into the power transmission system between the drive motor and the said device.

In known projectors an overload clutch is generally provided through the connection of the drive motor with the slide-changing and magazine-stepping device to be actuated by means of a friction gear which begins to slip when the force to be transmitted exceeds a normal value. This occurs, for example, when a slide becomes canted in its track or guideway during a slide-changing operation and causes the mechanism which moves the slide to become locked and incapable of effecting further slide or magazine movements. Such a breakdown is not always immediately apparent to the user of the projector, so that upon continued slippage of the friction gear for a relatively long period of time, overloading of and thereby damage to the drive motor could result.

The principal object of the present invention is to provide an overload clutch in a slide projector which, at the occurrence of an overload, indicates the existence of the abnormal operating condition of the slide-changing mechanism to the user by means of a distinct, discernible signal and causes him thereby to shut off the motor so as to protect it from becoming damaged.

Another object of the present invention is the provision of such an overload clutch which is foolproof in operation and, upon occurrence of an abnormal operating condition, generates a signal that cannot be confused with a normal state of operation of the projector.

Still another object of the present invention is the provision of an overload clutch as aforesaid which is both of extremely simplified construction and inexpensive to produce, and also requires substantially no maintenance or supervision during the life of the projector.

More particularly, in accordance with the present invention, provision is made in a projector of the aforesaid type that two cooperating parts of the overload clutch are interconnected with one another by means of a resilient or yielding click-stop device which transmits normal forces but disengages under overloads. In an overload clutch constructed in this manner, the noises or sounds made by the yielding click-stop device upon occurrence of an overload constitute the signal indicating the existence of the abnormal operating condition. The volume and pitch of the sound can, of course, be varied within wide limits by corresponding construction of the click-stop device.

The foregoing and other objects of the present invention will be more clearly understood from the following detailed description thereof when read in conjunction with the accompanying drawings, in which:

FIG. 1 is a side elevational view of a projector constructed in accordance with the present invention, the housing being partly broken away to show interior details;

FIG. 2 is a top plan view of the projector shown in FIG. 1 with the housing removed;

Figure 3:
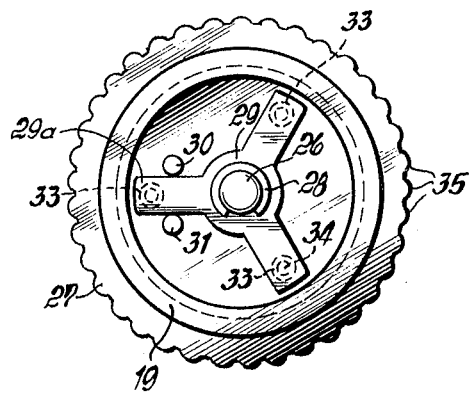
FIG. 3 is a side elevational view, on an enlarged scale, of a part of the overload clutch according to this invention.

Referring now more particularly to the drawings, the slide projector illustrated in FIGS. 1 and 2 comprises a base 1 and a housing 2 mounted thereon. As clearly shown in FIG. 2, the base supports the optical parts of the apparatus, to wit an objective 3, condenser lenses 4 and 5, a heat-resistant glass shield 6, a concave mirror or reflector 7, and a projection lamp 8 positioned intermediate the lens 5 and the reflector 7. In a passageway 9 located adjacent these parts a slide magazine 10 is guided for longitudinal displacement, the magazine having the usual tracks or channels in which slides 11 are disposed. A slide-shifting arm or bar 12 extends transversely to the passageway 9 and is operable for sequentially displacing the slides 11 one at a time from the magazine to the aperture or stage 13 and returning them to the magazine in a generally conventional manner. The mechanism (not shown in detail) for effecting the required reciprocal movement of the slide-changing or shifting arm 12 and the stepping or advancing of the slide magazine 10 is, for the duration of each slide-changing operation, connected with a worm 14 (FIG. 4) which is fixed on an axle 15 arranged to be driven by a motor 16 in a manner to be more fully described hereinafter.

Figure 4:
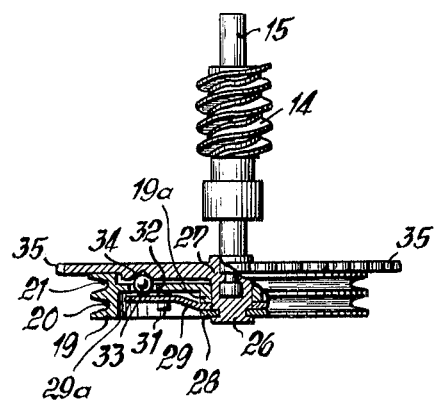
FIG. 4 is a partly sectional plan view of the said overload clutch.

Mounted on the motor shaft 16a is a pulley 17 which is drivingly connected by means of an endless belt 18 to a pulley 19. The pulley 19, as clearly shown in FIG. 4, is essentially drum-shaped and provided with two grooves 20 and 21, the former accommodating the belt 18 and the groove 21 accommodating a belt 22 by means of which the pulley 19 is drivingly connected to a pulley 23. The latter is fixed on an axle 23a journaled in a bracket 24 and carries at its opposite end a fan or blower 25. The motor 16 runs continuously during the operation of the projector, and the constantly rotating blower thus generates a stream of cooling air which flows over the lamp 8, the optical parts 4, 5, 6 and 7, and the stage 13.

The pulley 19 is rotatably mounted (FIG. 4) on an axial projection 26 of a clutch plate 27 which is fixed to the axle 15. The projection 26 is provided with a peripheral groove in which is mounted an open spring plate or washer 28. A three-armed leaf spring 29 is also rotatably mounted on the projection 26 between the spring plate or washer 28 and the hub 19a of the pulley 19 and thus is held in engagement with the said hub of the pulley 19 by means of the washer 28. One of the arms 29a of the leaf spring 29 is confined between two pins 30 and 31 fixed to the pulley 19, whereby the leaf spring 29 is held stationary relative to the pulley 19. The arms of the said leaf spring overlie respective openings 32 provided in the pulley 19, in each of which lies a ball 33 which engages in a corresponding notch or depression 34 in the clutch plate 27.

The size of the balls 33, the depth of the depressions 34 and the pressing force of the arms of the leaf spring 29 are so predetermined that this detent coupling or clutch can transmit from the driving pulley 19 to the driven clutch plate 27 a force which is sufficient, with a margin of safety, for a normal movement of the slide-changing and magazine-stepping mechanism. In the event that this mechanism becomes overloaded, however, or even blocked during a slide-changing operation, for example by a slide 11 being improperly positioned in the magazine 10 or by the frame of a slide becoming stuck in the aperture or stage 13 because of warping or other deviations from standard dimensions, the clutch plate 27 slows down or even stops rotating due to the increased resistance to the rotation of the axle 15. By virtue of the present invention, this has no adverse effect on the projector, inasmuch as the clutch can yield or disengage by the balls 33 being dragged out of and leaving the depressions 34 against the force of the spring 29. The motor 16 can then continue to run without being injuriously overloaded so as to continue to move the pulley 19, and thereby the blower 25, relative to the now only slowly rotating or even stationary clutch plate 27.

Under these conditions, the balls 33, i.e. the detent elements, slip rapidly over the depressions or notches 34, i.e. the catch elements, and thus cause a rattling noise or sound through which the user's attention is called to the abnormality that has arisen in the operation of apparatus. The user will then immediately turn off the motor 16, whereupon the operation-interrupting condition can be eliminated by a reverse rotation of the clutch plate 27 and a consequent reverse movement of the slide-changing mechanism. To this end, the clutch plate 27 is peripherally knurled, as shown at 35, and this knurled edge 35 is made accessible to the user, as can be seen from FIG. 1, through the provision of a slot 36 in a depression 37 of the base 1 into which slot the peripheral edge of the plate extends.

The noise-making overload clutch according to the present invention can also be constructed otherwise than as hereinbefore described. Merely by way of example, in lieu of balls 33 cooperating with round depressions 34, other detent elements, such as rollers, can be employed in conjunction with other catch elements, such as groove-shaped depressions. The arms of the leaf spring 29 may, alternatively, be provided with indentations or stamped out projecting parts which engage directly in suitable depressions, such as holes, grooves or the like, formed in the clutch plate 27. Also, in lieu of depressions the clutch plate 27 may be provided with raised knobs, ridges or other catch elements capable of obstructing the free passage (under normal load) of the detent elements. Within the purview of the present invention, of course, although the clutch plate 27 and the cooperating plate-like wall of the pulley drum 19 are illustrated as being connected by three coupling elements, it is possible to employ either a smaller or a greater number of such coupling elements. In any of these arrangements, moreover, the detent elements of whatever type may be carried by the clutch plate 27, while the corresponding depressions or other catch elements may be provided on the pulley 19.

It is to be understood that the foregoing disclosure of preferred embodiments of the present invention is for purposes of illustration only, and that a number of changes and modifications may be made in structural features and relationships set forth without any departure from the spirit and scope of the present invention as defined in the hereto appended claims.

Having thus described the invention, what is claimed and desired to be secured by Letters Patent is:

1. In a slide projector equipped with a slide-supporting magazine, a mechanically operable slide-changing and magazine-stepping device, a drive motor, transmission means operatively interconnecting said drive motor and said device, and a housing enclosing said magazine, said device, said drive motor and said transmission means; an overload clutch incorporated in said transmission means, said clutch comprising a rotatable clutch plate drivingly connected with said device and having a knurled peripheral edge, said housing being provided with an aperture through which a portion of said peripheral edge of said clutch plate extends so as to be manipulatable from outside said housing, said clutch plate being provided in one face thereof with a plurality of depressions, a rotatable drum mounted coaxially with said clutch plate and provided with a corresponding plurality of openings in its end wall adjacent said clutch plate, a plurality of balls disposed in said openings, respectively, and adapted to engage in the corresponding depressions, said drum being connected with said drive motor so as to be driven thereby, and spring means associated with said drum and bearing on said balls so as to urge the same outwardly of said end wall of said drum into rolling contact with said one face of said clutch plate, said spring means under normal loads holding said balls in said depressions so as to connect said drum drivingly to said clutch plate, but under overloads permitting disengagement of said balls from said corresponding depressions so as to interrupt the driving connection between said drum and said clutch plate, said spring means cooperating with said balls and said depressions under overloads for providing an audible signal indicating the existence of an overload, so that the operator can then manually turn said rotatable clutch plate by engaging said knurled peripheral edge thereof for manually eliminating the overload.

2. In a slide projector according to claim 1; said drum being provided with a peripheral groove, and an endless drive belt received in said groove and establishing the driving connection between said drive motor and said drum.

3. In a slide projector equipped with a slide-supporting magazine, a mechanically operable slide-changing and magazine-stepping device, a drive motor, transmission means operatively interconnecting said drive motor and said device, and a housing enclosing said magazine, said device, said drive motor and said transmission means; and overload clutch incorporated in said transmission means, said clutch comprising a rotatable clutch plate drivingly connected with said device and having a knurled peripheral edge, said housing being provided with an aperture through which a portion of said peripheral edge of said clutch plate extends so as to be manipulatable from outside said housing, said clutch plate being provided in one face thereof with a plurality of depressions, a rotatable drum mounted coaxially with said clutch plate and provided with a corresponding plurality of openings in its end wall adjacent said clutch plate, a plurality of balls disposed in said openings, respectively, and adapted to engage in the corresponding depressions, said drum being connected with said drive motor so as to be driven thereby, and spring means associated with said drum and bearing on said balls so as to urge the same outwardly of said end wall of said drum into rolling contact with said one face of said clutch plate, said spring means under normal loads holding said balls in said depressions so as to connect said drum drivingly to said clutch plate, but under overloads permitting disengagement of said balls from said corresponding depressions so as to interrupt the driving connection between said drum and said clutch plate, said drum being provided with a peripheral groove, and an endless drive belt received in said groove and establishing the driving connection between said driving motor and said drum; a blower mounted in said housing for cooling the interior of the latter during operation of the projector, said drum being further provided with a second peripheral groove, and a second endless drive belt received in said second groove and establishing a driving connection between said drum and said blower.

4. In a slide projector, a drive assembly including an overload clutch means capable of yielding and terminating the transmission of a drive under overload conditions, such clutch means automatically providing a signal indicating the presence of an overload and said clutch means having a manually engageable portion freely accessible at the exterior of the projector and responding to manipulation of said manually engageable portion by the operator for eliminating the overload condition, said manually engageable portion of said clutch means being capable of manipulation without the use of any tool so that immediately upon receiving said signal the operator without resorting to the use of any tools or other aids can manually engage said manually engageable portion of said clutch means to eliminate the condition which caused the overload.

References Cited by the Examiner

UNITED STATES PATENTS

| | | | |
|---|---|---|---|
| 1,821,543 | 9/1931 | Coultas | 192—56 |
| 2,773,370 | 12/1956 | Intraub et al. | 192—56 |
| 2,837,190 | 6/1958 | Blakeslee | 192—56 |
| 2,979,987 | 4/1961 | Brumley et al. | 88—26 X |
| 3,152,509 | 10/1964 | Zillmer et al. | 352—202 |

NORTON ANSHER, *Primary Examiner.*

V. A. SMITH, *Assistant Examiner.*